(12) United States Patent
Tanaka

(10) Patent No.: US 7,545,064 B2
(45) Date of Patent: Jun. 9, 2009

(54) VEHICLE ALTERNATOR WITH INCREASED SHOCK RESISTANCE

(75) Inventor: Akihiro Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 11/808,351

(22) Filed: Jun. 8, 2007

(65) Prior Publication Data
US 2008/0048534 A1   Feb. 28, 2008

(30) Foreign Application Priority Data
Aug. 24, 2006   (JP)   .............................. 2006-228381

(51) Int. Cl.
*H02K 5/00* (2006.01)
(52) U.S. Cl. ...................................................... 310/89
(58) Field of Classification Search .................... 310/89, 310/88, 91
See application file for complete search history.

(56) References Cited

U.S. PATENT DOCUMENTS

| 4,959,576 | A | | 9/1990 | Horibe et al. |
| 5,705,865 | A | * | 1/1998 | Ishida et al. ................... 310/62 |
| 6,294,856 | B1 | * | 9/2001 | Ishida et al. .................. 310/232 |
| 6,710,499 | B2 | | 3/2004 | Tsuge |
| 6,724,108 | B2 | * | 4/2004 | Nakano ..................... 310/68 D |

FOREIGN PATENT DOCUMENTS

| JP | B2 7-32571 | 4/1995 |
| JP | A 2002-359951 | 12/2002 |

* cited by examiner

*Primary Examiner*—Nguyen N Hanh
(74) *Attorney, Agent, or Firm*—Oliff & Berridge, PLC

(57) ABSTRACT

A vehicle alternator is disclosed as having a stator having a stator winding, a rotor carried on a rotary shaft and rotatably supported inside an inner periphery of the stator, an electric device involving a rectifier for converting an AC voltage, induced in the stator winding, into a DC voltage, and a protector cover for covering the electric device. The protector cover includes a cover body, placed in a position to cover the electric device involving the rectifier, and a cover convex portion extending outward from the cover body along an axis of the rotary shaft of the rotor. The cover convex portion has an inside formed with an open space in which no electric device is disposed.

10 Claims, 3 Drawing Sheets

VEHICLE ALTERNATOR WITH INCREASED SHOCK RESISTANCE

CROSS REFERENCE TO RELATED APPLICATIONS

This application is related to Japanese Patent Application No. 2006-228381, filed on Aug. 24, 2006, the content of which is hereby incorporated by reference.

BACKGROUND OF THE INVENTION

1. Technical Field of the Invention

The present invention relates to vehicle alternators and, more particularly, to a vehicle alternator installed on a vehicle such as a passenger car and a truck or the like.

2. Description of the Related Art

With vehicle alternators of the related art, it has been a general practice for electric devices such as a regulator and a rectifier, etc., to be located on a body of the alternator in an area remotest from a pulley (see, for instance, U.S. Pat. No. 6,710,499). The alternator usually includes a protector cover in the form of a protector cover that is fixed to the body of the alternator to cover the electric devices. The protector cover takes the form of a structure configured to prevent foreign matters from entering an inside of the protector cover.

In addition, a vehicle alternator has been known with a structure employing a sealing member interposed between a protector cover and a brush holder so as to have a waterproof function to halt water-incursions on brushes (see, for instance, Japanese Patent Publication No. 7-32571). With the vehicle alternator of such a structure, the sealing member is pressed against a brush holder by means of the protector cover.

Meanwhile, during a process of assembling the vehicle alternator of the structure disclosed in the above U.S patent in a vehicle-assembly plat or the like, there are many probabilities for a service vehicle to handle the vehicle alternator by holding the pulley. During such handling step, if an error occurs with the vehicle alternator falling down to a floor or the like, the vehicle alternator drops onto the floor or the like with a rear side of the alternator placed downward. In this moment, an impact shock is directly exerted to the electric devices such as the regulator and the rectifier or the like mounted on the alternator at the rear side thereof. Thus, there is a fear of damage or cracking occurring in the electric devices with a resultant issue of causing defective functions. Moreover, with the vehicle alternator in which the sealing member is interposed between the protector cover and the brush holder, the protector cover is deformed in response to the impact shock due to the dropping of the alternator. In this moment, a gap is created in areas around the sealing member, causing an issue to arise for the brush portions to loose waterproof functions.

SUMMARY OF THE INVENTION

The present invention has been completed with a view to addressing the above issues and has an object to provide a vehicle alternator with increased shock resistance that can prevent an impact shock from being applied to an electric device placed inside a protector cover even in the occurrence of the alternator falling down. It is a further object of the present invention to provide a vehicle alternator that allows brush portions to be maintained under increased water-incursion resistance even when dropped to a floor or the like.

To achieve the above object, a first aspect of the present invention provides a vehicle alternator comprising a stator having a stator winding, a rotor carried on a rotary shaft and rotatably supported inside an inner periphery of the stator, an electric device involving a rectifier for converting an AC voltage, induced in the stator winding, into a DC voltage, and a protector cover for covering the electric device. The protector cover includes a cover body, placed in a position to cover the electric device involving the rectifier, and a cover convex portion extending outward from the cover body along an axis of the rotary shaft of the rotor. The cover convex portion has an inside formed with an open space in which no electric device is disposed.

With the vehicle alternator of such a structure, even if the vehicle alternator falls down to a floor or the like with the protector cover placed downward, the cover convex portion of the protector cover is initially brought into impact with the floor or the like. This enables the impact from being exerted to the electric device placed inside the protector cover.

Further, with the vehicle alternator of the present embodiment, the electric device may preferably include a brush device for supplying an excitation current to a field winding to generate a magnetic field for the rotor to be energized, and the cover convex portion is placed in face-to-face relation to the brush device.

In this respect, the cover convex portion of the protector cover is formed on the cover body in an area in the vicinity of the center position of the protector cover in face-to-face relation to the brush device placed in an area around the rotary shaft. Therefore, when the vehicle alternator falls down to the floor or the like with the protector cover placed downward, the cover convex portion of the protector cover can be initially brought into impact with the floor or the like in a highly reliable manner.

Further, there is a less flow of winds in an area around the brush device. This causes heats developed by the brushes and the slip rings to accumulate in such an area. However, the cover convex portion is formed on the cover body in an area in face-to-face relation to the brush device. This allows the cover convex portion of the protector cover to act as a heat dissipation space with a resultant effect of decreasing operating temperatures of the brushes. This enables a reduction in temperature of the brush device and its vicinity at high efficiency while preventing an impact shock from being exerted to the electric device.

With the vehicle alternator of the present embodiment, the brush device may preferably include brush bodies, held in pressured contact with slip rings provided on the rotary shaft, and a brush holder for accommodating therein the brush bodies, wherein the brush holder includes a cover portion placed in face-to-face relation to the protector cover.

With such a structure, the brush device can maintain an intrinsic function regardless of the distance between the brush device and the protector cover. Accordingly, with the brush device having a function with water-incursion resistance, even if the vehicle alternator falls down to the floor or the like with the protector cover placed downward, the cover convex portion of the protector cover is initially deformed, enabling the function of water-incursion resistance to be maintained.

A second aspect of the present invention provides a vehicle alternator comprising front and rear frame coupled to each other in an axial direction thereof, a stator fixedly supported with the front and rear frames and having a stator winding, a rotor carried on a rotary shaft, rotatably supported with the front and rear frames in an area inside an inner periphery of the stator, and having a field winding to generate a magnetic field for the rotor to be energized, an electric device involving a rectifier supported on the rear frame for converting an AC voltage, induced in the stator winding, into a DC voltage, and a protector cover covering the electric device. The protector cover includes a cover body, fixedly secured to the rear frame in an area to cover the electric device involving the rectifier, and a cover convex portion axially extending outward from the cover body along an axis of the rotary shaft of the rotor. The cover convex portion has an inside formed with an open space in which no electric device is located.

With the vehicle alternator of such a structure, even if the vehicle alternator falls down to a floor or the like with the protector cover placed downward, the cover convex portion of the protector cover is initially brought into impact with the floor or the like. This enables the impact from being exerted to the electric device placed inside the protector cover.

DETAILED DESCRIPTION OF PREFERRED EMBODIMENTS

Now, a vehicle alternator of an embodiment according to the present invention will be described below in detail with reference to the accompanying drawings. However, the present invention is construed not to be limited to such an embodiment described below and technical concepts of the present invention may be implemented in combination with other known technologies or the other technology having functions equivalent to such known technologies.

A vehicle alternator of an embodiment according to the present invention will be described below in detail with reference to the accompanying drawings.

Figure 1:
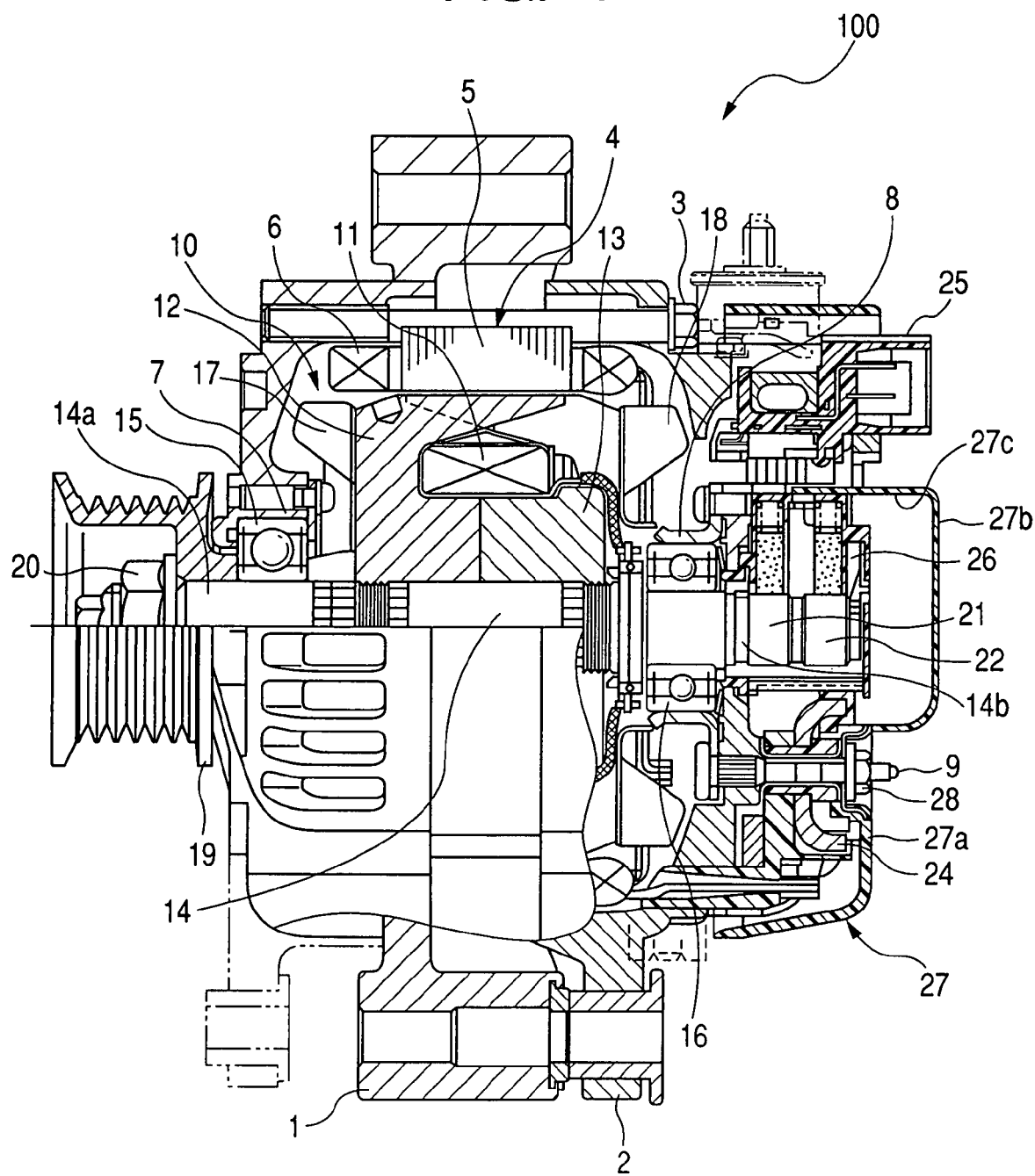
FIG. 1 is a cross sectional view showing an overall structure of a vehicle alternator of an embodiment according to the present invention.

FIG. 1 is a longitudinal cross sectional view showing an overall structure of the vehicle alternator of the present embodiment implementing the present invention.

As shown in FIG. 1, the vehicle alternator 100 includes a front frame 1, a rear frame 2, a stator 4 supported with the front and rear frames 1, 2, a rotor 10 carried on a rotary shaft 14 to be rotatable inside the stator 4, a rectifier 24, a voltage controller 25, a brush device 26 and a protector cover 27, etc.

Both the front and rear frames 1, 2 take bowl-shapes in cross section with openings placed in face-to-face relation to each other, under which the front and rear frames 1, 2 are tightened to each other by means of a plurality of bolts 3 with the stator 4 being sandwiched. The front frame 1 is integrally formed with a cylindrical bearing box 7. Likewise, the rear frame 2 has a cylindrical bearing box 8, made of iron, which is fixedly secured to the rear frame 2 by means of a plurality of knurled bolts 9.

The stator 4 includes a stator core 5, fixedly supported with the front and rear frames 1, 2, and a stator winding 6 carried by the stator core 5 and composed of, for instance, a three phase winding to generate, for instance, a three-phase AC voltage. The rotor 10 includes front and rear pole cores 12, 13, carrying thereon a field winding 11, which are fixedly supported on the rotary shaft 14. The bearing boxes 7, 8 rotatably support the rotary shaft 14 such that the rotor 10 is rotatable inside an inner periphery of the stator core 5. The pole cores 7, 8 have axial end faces carrying thereon front and rear centrifugal type cooling fans 17, 18, respectively. The centrifugal type front cooling fan 17 includes a mixed flow fan that has a plurality of fan blades tilted forward with respect to a rotational direction of the rotor 10 for the purpose of flowing a cooling wind toward the field winding 11. In addition, the rotary shaft 14 has a front-end 14a, on which a pulley 19 is fixedly mounted by means of a nut 20, to be rotatably driven with an output torque of a vehicle engine (not shown). Moreover, the rotary shaft 14 has a rear end portion 14b, placed in an area outside the rear frame 2, which is formed with a pair of slip rings 21, 22 at given axially spaced positions. The slip rings 21, 22 are electrically connected to the field winding 11.

The so-called electric device such as electric component parts including the rectifier 24, the voltage controller 25 and the brush device 26, etc., are fixedly secured to an axial end face of the rear frame 2 in an outside area thereof by suitable fixture means such as bolts 9 or the like. The rectifier 24 rectifies the three-phase AC voltage, generated by the stator winding 6, for conversion to a DC output voltage. The voltage controller 25 serves to regulate an excitation current flowing through the field winding 11 for controlling the output voltage of the vehicle alternator 100. The brush device 26 serves to flow the excitation current from the rectifier 24 to the field winding 11 of the rotor 10 and includes two brushes held in pressured contact with the slip rings 21, 22 formed on the rear end portion 14b of the rotary shaft 14.

The protector cover 27 includes a protector cover, serving as an outer shell, which is made of resin such as, for instance, nylon. The protector cover 27 serves to cover the electric device such as the electric component parts including the rectifier 24, the voltage controller 25 and the brush device 26, etc., for protection thereof. A nut 28 is screwed onto a rear end of a bolt 9 axially extending from the rear flame 2 to tightly fix the rectifier 24 thereto. A detail of the protector cover 27 will be described below.

With such a structure set forth above, the vehicle alternator 100 is driven to rotate in a given direction in response to a drive torque delivered from the engine to the pulley 19 via a belt or the like. Under such a status, applying an excitation current to the field winding 11 of the rotor 10 from an external power supply enables respective claw poles of the pole cores 12, 13 to be excited to cause the stator winding 6 to generate a three-phase AC voltage. The three-phase AC voltage is rectified with the rectifier 24 for conversion to a given DC output voltage, which is extracted from output terminals of the rectifier 24.

Figure 2:
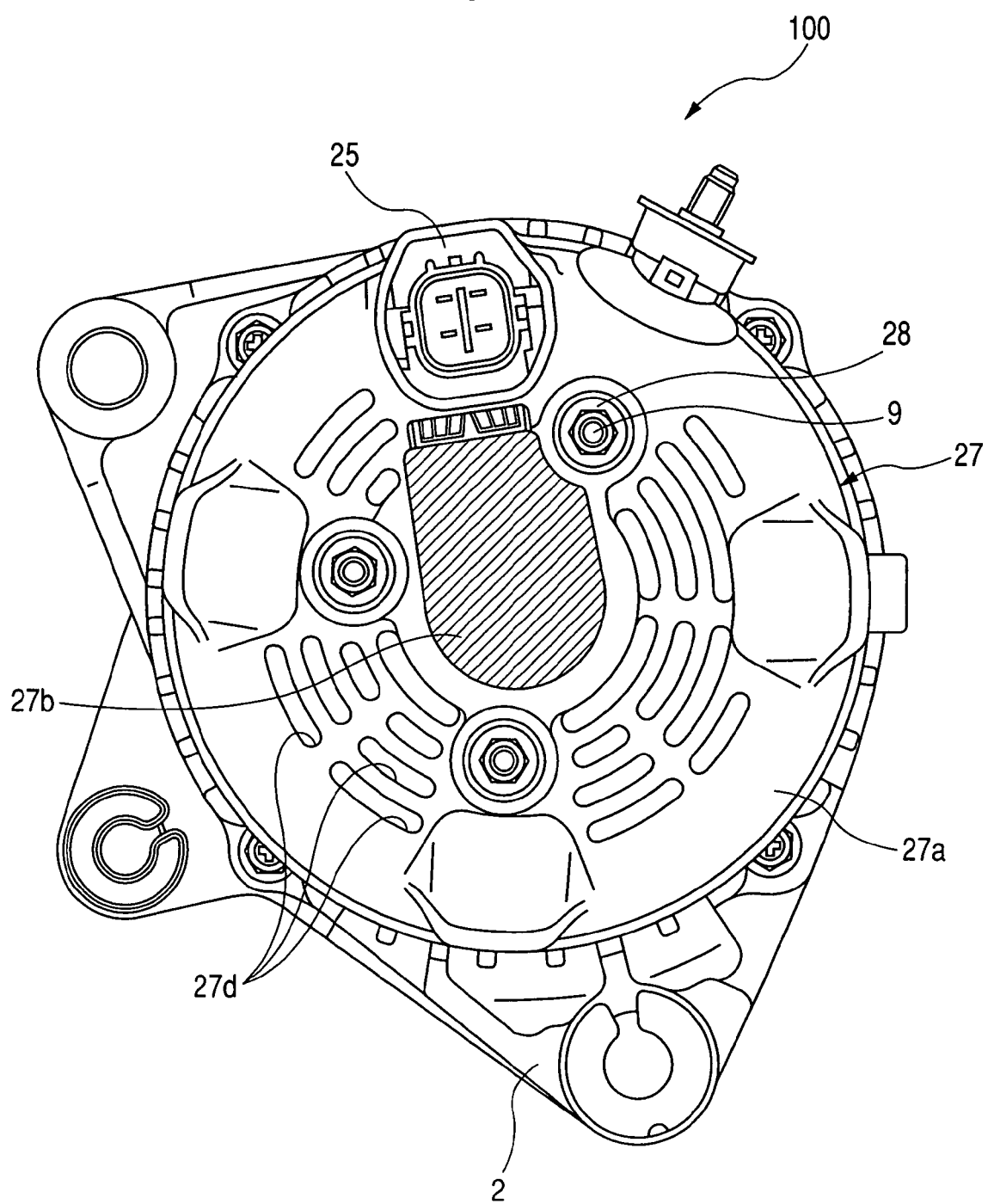
FIG. 2 is a rear view of the vehicle alternator of the present embodiment shown in FIG. 1 as viewed from a rear side of the vehicle alternator.

FIG. 2 is a rear view of the vehicle alternator 100 of the present embodiment as viewed from a rear side thereof. As shown in FIGS. 1 and 2, with the vehicle alternator 100 of the present embodiment, the protector cover 27 includes a substantially circular cover body 27a fixedly secured to the rear frame 2 on a rear end face thereof, and a cover convex portion 27b, axially extending rearward from the cover body 27a along an axis of the rotary shaft 14 of the rotor 10. The cover convex portion 27b is indicated by hatching in FIG. 2.

The cover convex portion 27b is internally formed with an open space 27c playing a role as an impact absorber in which no electric circuit elements such as the rectifier 24 and the brush device 26, etc., are located. With the vehicle alternator 100 of the present embodiment, especially, the cover convex portion 27b is formed in an area in face-to-face relation to the brush device 26 among the electric components shown in FIGS. 1 and 2.

Further, the protector cover 27 has a plurality of ventilation windows 27d formed on the cover body 27a in an area in face-to-face relation to the rectifier 24 for introducing cooling winds thereto. A distance (referred to as a distance "A") between the cover body 27a, formed with the ventilation windows 27d, and the rectifier 24 is set to be less than a distance (referred to as a distance "B") between the cover convex portion 27b and the brush device 26. For instance, the distance "B" is set to a value of 10 mm and the distance "A" is set to a value approximately ranging from 1 to 2 mm.

Figure 3:
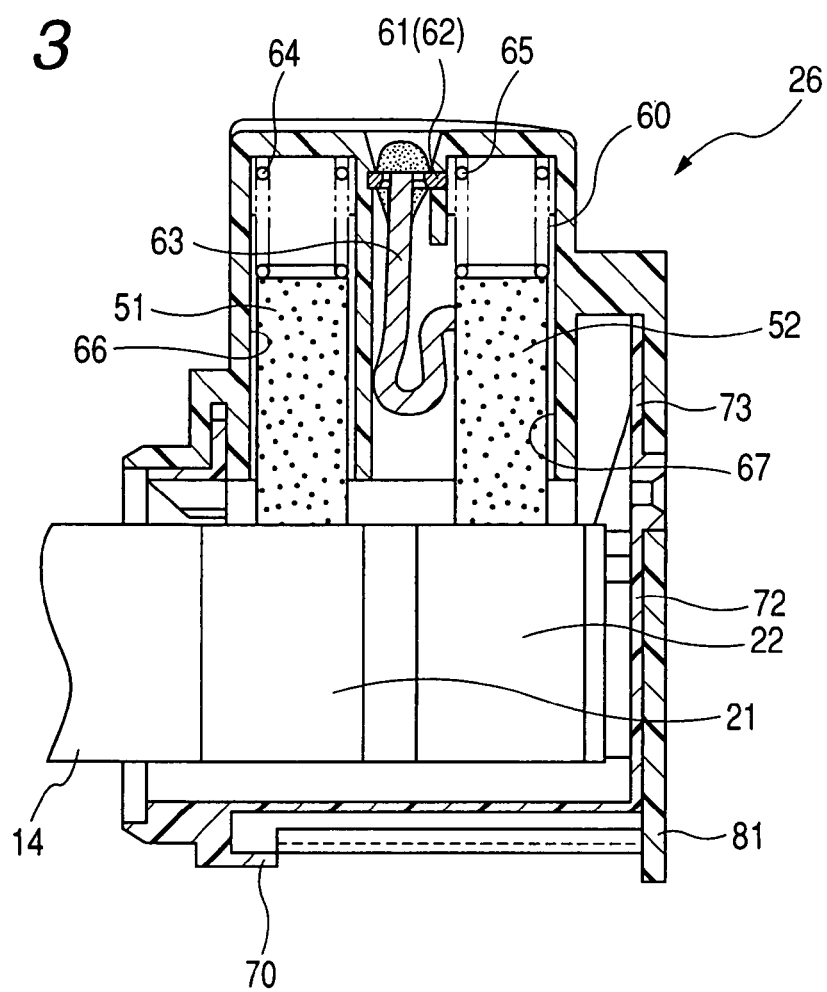
FIG. 3 is an enlarged fragmentary view showing a brush device of the vehicle alternator of the present embodiment shown in FIG. 1.
Figure 4:
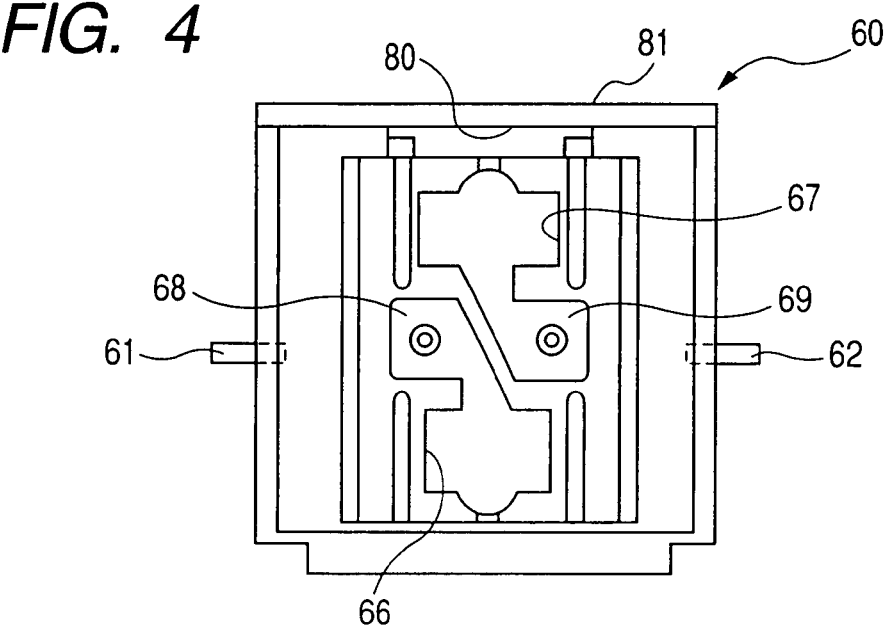
FIG. 4 is a plan view showing a brush holder forming part of the brush device shown in FIG. 3 as viewed in a radial direction.

Next, a description is made of a detailed structure of the brush device 26 combined 20' with the protector cover 27 set forth above. FIG. 3 is an enlarged cross sectional view showing the brush device 26 under a status assembled to the vehicle alternator 100. FIG. 4 is a plan view showing a brush holder, forming a part of the brush device 26, as viewed from the above in a radiated direction.

The brush device 26 includes a brush holder 60, made of resin, which has connection terminals 61, 62, a pair of brush bodies 51, 52, pig tails 63 serving as brush copper wires, respectively, through which the brush bodies 51, 52 and the connection terminals 61, 62 are electrically connected, a slip ring cover 70, and springs 64, 65.

The brush holder 60 takes the form of a substantially box-like configuration in cross section and has brush accommodating portions 66, 67 facing the slip rings 21, 22, pig tail receiving portions 68, 69 for receiving therein the pig tails 63, respectively, and a radiated recess 80 for insertion of an extension 73 of a lid cover 72 of the slip ring cover 70, all of which are opened. In addition, the brush holder 60 has a cover portion 80 that closes an axial end portion placed in face-to-face relation to a rear end face of the rotary shaft 14 (in opposition to the pulley 19).

The lid cover 72, formed on the slip ring cover 70 at the axial end thereof, has a protrusion and the cover portion 81, adapted to cover the axial end of the brush holder 60, has a bore, with the protrusion of the lid cover 72 being fitted to the bore of the cover portion 81. This allows the brush holder 60 and the slip ring cover 70 to be coupled to each other. The protrusion of the lid cover 72 and the bore of the cover portion 81 constitute an engaging portion. The use of such an engaging portion makes it easy to assemble the brush holder 60 and the slip ring cover 70 to each other and hold these component elements in a fixed place, resulting in an increase in workability and airtightness.

With the vehicle alternator 100 of the embodiment, the protector cover 27 has the cover convex portion 27b, axially protruding outward from the cover body 27a along the axis of the rotary shaft 14 of the rotor 10, which has the open space 27c in which no electric component is located. Therefore, even if an accident occurs with the vehicle alternator 100 falling down with the protector cover 27 laid downward, the cover convex portion 27b of the protector cover 27 is initially brought into impact with a floor or the like and deformed in configuration. This disenables an impact shock to be exerted to the electronic component parts located inside the protector cover 27. Especially, the cover convex portion 27b is formed on the cover body 27a in a position facing the brush device 26 disposed in an area around the rotary shaft 14, that is, in an area close proximity to a center position of the protector cover 27. Therefore, even if the vehicle alternator 100 falls down to the floor with the protector cover 27 laid downward, the cover convex portion 27b of the protector cover 27 can be initially brought into collision with the floor or the like in a reliable manner.

Further, a wind is less likely to flow through a localized area around the brush device 26 and, hence, heats developed by the brushes 51, 52 and the slip rings 21, 22 tend to accumulate in such a localized area. However, since the protector cover 27 has the cover convex portion 27b protruding from the cover body 27a to have the inner space 27c, the cover convex portion 27b can act as a heat dissipation space, causing a reduction in temperature of the brushes. This results in a capability of decreasing the temperatures of the brush device 26 and its vicinity at increased efficiency, while preventing the electric components from impact shocks.

Further, the brush holder 60 of the brush device 26 has the cover portion 81 formed in an area facing the protector cover 27. This enables the brush device 26 per se to exhibit an intrinsic function regardless of a distance between the brush device 26 and the protector cover 27. Accordingly, with the brush device 26 forming part of the vehicle alternator 100 of the present embodiment, the brush holder 60 and the slip ring cover 70 are employed to cover the areas around the slip rings 21, 22 and the brush bodies 51, 52 for thereby increasing airtightness while having an increased waterproof function. With such a structure, even if the vehicle alternator 100 falls down to the floor with the protector cover 27 laid downward causing the deformation of the cover convex portion 27b, such a waterproof function can be maintained.

While the present invention has been exemplarily described in detail with reference to the vehicle alternator of the specific embodiment employing the protector cover with particular features. The present invention is not limited to such a specific embodiment. With the vehicle alternator of the present embodiment, while the protector cover 27 has been described as the structure made of resin, the protector cover 27 may be made of metallic material such as aluminum or iron or the like if desired. Further, the protector cover 27 has been described as including the cover convex portion 27b formed in the substantially central area of the cover body 27a. However, the cover convex portion 27b may be formed in other suitably modified areas on the cover body 27a so as to have the same functions. In an alternative, the cover convex portion 27b may include cover convex components formed on the cover body 27a at discrete positions thereof.

Thus, the particular arrangement disclosed is meant to be illustrative only and not limited to the scope of the present invention, which is to be given the full breadth of the following claims and all equivalents thereof.

What is claimed is:

1. A vehicle alternator comprising:

a stator having a stator winding;

a rotor carried on a rotary shaft and rotatably supported inside an inner periphery of the stator;

an electric device including a brush device for supplying an excitation current to a field winding to generate a magnetic field for the rotor to be energized and having brushes and a brush holder accommodating the brushes, and a rectifier for converting an AC voltage, induced in the stator winding, into a DC voltage; and a protector cover for covering the electric device;

the protector cover including a cover body, placed in a position to cover the electric device including the brush device and the rectifier, and a cover convex portion axially protruding outward from the cover body along an axis of the rotary shaft of the rotor and formed on the cover body in an overall area axially placed in a face-to-face relation to the brush device and axially space therefrom to prevent an impact shock from being exerted to the electric device located inside the protector cover upon receipt of an external shock;

wherein the cover convex portion has an inside formed with an open space in which no electric device is disposed to allow the convex portion to act as an impact absorber.

2. The vehicle alternator according to claim 1, wherein:

the rotor has an axial end carrying thereon slip rings associated with the brush device;

the brush device includes a cover portion closing the axial end of the rotor to cover the slip rings; and the cover convex portion is spaced from the cover portion of the brush device by a given axial distance.

3. The vehicle alternator according to claim 1, wherein:

the protector cover has a plurality of ventilation windows for drawing cooling winds to areas facing the rectifier;

the cover body, formed with the ventilation windows, is closer in distance to the rectifier than that in which the cover convex portion is spaced from the brush device.

4. The vehicle alternator according to claim 1, wherein:

the brush device includes brush bodies, held in pressured contact with slip rings provided on the rotary shaft, and the brush holder accommodating therein the brush bodies;

wherein the brush holder includes a cover portion placed in face-to-face relation to the protector cover.

5. A vehicle alternator comprising:

front and rear frames coupled to each other in an axial direction thereof;

a stator fixedly supported with the front and rear frames and having a stator winding;

a rotor carried on a rotary shaft, rotatably supported with the front and rear frames in an area inside an inner periphery of the stator, and having a field winding to generate a magnetic field for the rotor to be energized;

an electric device including a brush device for supplying an excitation current to a field winding to generate a magnetic field for the rotor to be energized and having brushes and a brush holder accommodating the brushes, and a rectifier supported on the rear frame for converting an AC voltage, induced in the stator winding, into a DC voltage; and a protector cover covering the electric device;

the protector cover including a cover body, fixedly secured to the rear frame in an area to cover the electric device including the brush device and the rectifier, and a cover convex portion axially extending outward from the cover body along an axis of the rotary shaft of the rotor and formed on the cover body in an overall area axially placed in a face-to-face relation to the brush device and axially space therefrom to prevent an impact shock from being exerted to the electric device located inside the protector cover upon receipt of an external shock;

wherein the cover convex portion has an inside formed with an open space in which no electric device is located to allow the cover convex portion to act as an impact absorber.

6. The vehicle alternator according to claim 5, wherein:

the rotor has an axial end carrying thereon slip rings associated with the brush device;

the brush device includes a cover portion closing the axial end of the rotor to cover the slip ring; and the cover convex portion is spaced from the cover portion of the brush device by a given axial distance.

7. The vehicle alternator according to claim 5, wherein:

the protector cover has a plurality of ventilation windows formed on the cover body for drawing cooling winds to areas facing the rectifier;

the cover body, formed with the ventilation windows, is closer in distance to the rectifier than that in which the cover convex portion is spaced from the brush device.

8. The vehicle alternator according to claim 5, wherein:

the rotary shaft has a rear end formed with slip rings for supplying an excitation current to the field winding;

the brush device includes brush bodies, held in pressured contact with the slip ring, respectively, the brush holder accommodating the brush bodies;

wherein the brush holder includes a cover portion placed in face-to-face relation to the protector cover.

9. The vehicle alternator according to claim 8, wherein:

the brush device further includes a slip ring cover connected to the brush holder to cover the slip rings formed on the rotary shaft at the rear end thereof.

10. The vehicle alternator according to claim 9, wherein:

the slip ring cover includes a lid cover covering a rear end face of the slip ring cover; and wherein the cover portion of the brush device is detachably coupled to the lid cover of the slip ring cover.

* * * * *